Patented May 16, 1939

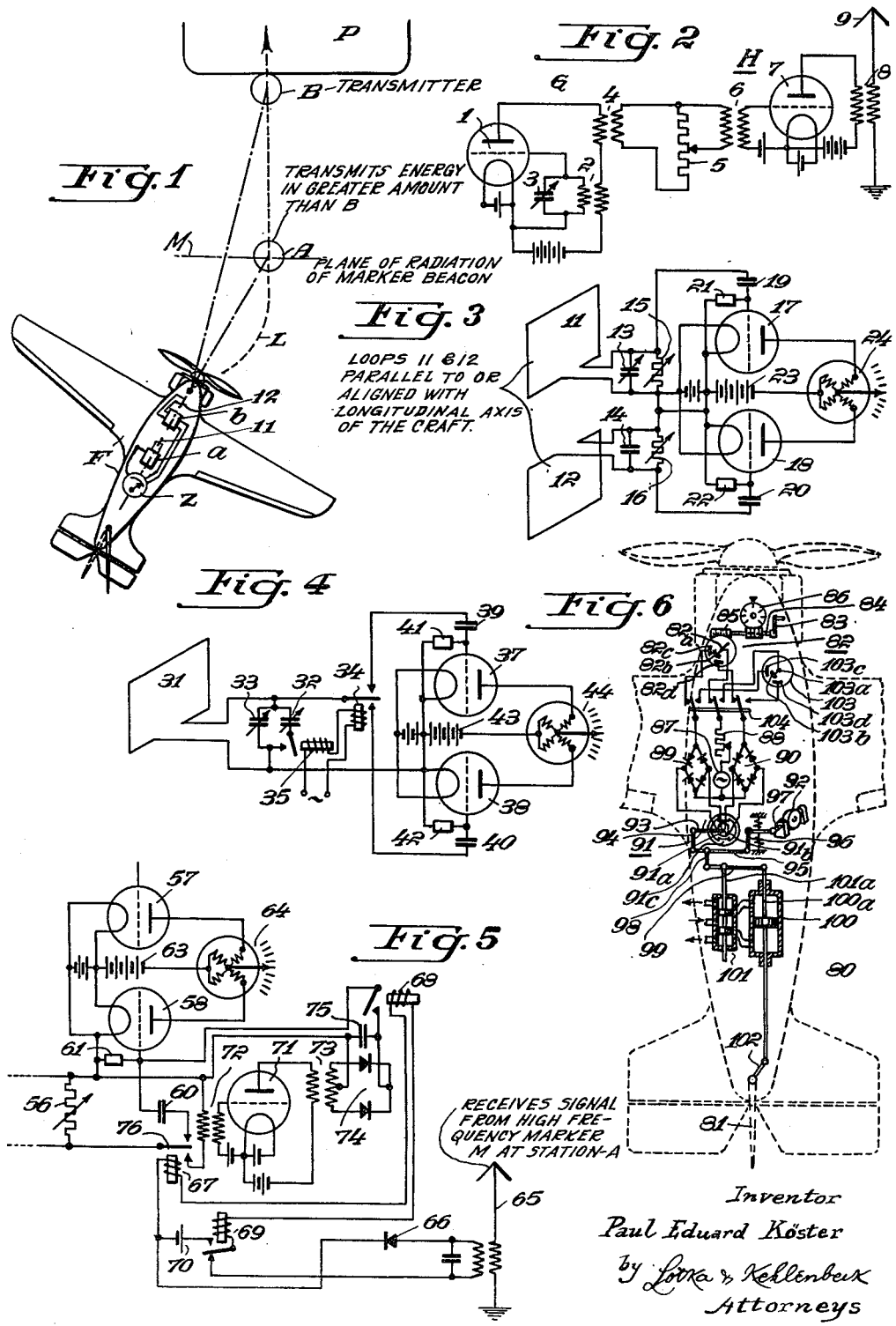

2,158,584

UNITED STATES PATENT OFFICE 2,158,584

COURSE FINDING METHOD AND APPARATUS

Paul Eduard Köster, Berlin-Siemensstadt, Germany, assignor to Siemens Apparate und Maschinen G. m. b. H., Berlin, Germany, a corporation of Germany Application March 18, 1935, Serial No. 11,691
In Germany March 17, 1934

8 Claims. (Cl. 250—11)

(Granted under the provisions of sec. 14, act of
March 2, 1927; 357 O. G. 5)

My invention relates to a method and a device for controlling the steering of an aircraft in a horizontal plane in a predetermined direction with respect to a predetermined point, for instance to a certain point of a landing field preliminary to the actual landing thereon.

In order to prepare an aircraft for landing not only is it necessary that the aircraft be kept headed in such a direction so that it can head for a given point of the flying field, but also it is as a rule necessary in view of the dimensions of the landing field that the longitudinal axis of the aircraft be oriented a given direction in heading for the aforesaid point.

The present invention has for its object to provide a suitable method and a suitable device for the above purpose. The essence of the novel method consists in the fact that the aircraft is steered in the desired direction by means of two or more direction finding operations with respect to the point to be headed for and to another point.

A further object is to provide a plurality of aligned radio transmitters and a plurality of receiving means mounted on the craft, and means whereby the receivers are affected to different degrees by the signals emitted by the respective transmitters in order that the alignment of said transmitters may be utilized to orient the craft in a particular manner so that the transmitters will be reached by the craft in a desired sequence.

Still another object is to provide a novel radio receiving means whereby a plurality of receiving means may be replaced by a single receiving means.

Still another object is to provide novel means to vary the actuation of the receiving means when the craft passes the first of the plurality of transmitters, whereby the corrective effect of the transmitter passed is maintained in the proper direction.

For further understanding of the nature of the invention reference may be had to the following description taken in conjunction with the accompanying drawing, in which Fig. 1 is a diagrammatic illustration of an airplane equipped with the novel device, the airplane being directed according to the method of the invention initially in a path outside the direction of the transmitters, toward a landing field equipped with two transmitting stations.

Fig. 2 illustrates a wiring diagram of one form form of circuit for both transmitting stations.

Fig. 3 illustrates a wiring diagram of a circuit for a receiving device provided with two separate receiving circuits.

Fig. 4 illustrates a wiring diagram of a receiving device provided with only one receiving circuit.

Fig. 5 illustrates a wiring diagram of a receiving device the polarity of one circuit of which is reversed after the aircraft has passed over one of the transmitting stations.

Fig. 6 illustrates the application of the novel device to an automatic directional steering device.

Referring to Fig. 1, P denotes a landing field in which the landing direction is indicated by the arrow. At the boundary of the landing field a point equipped with a transmitting station is indicated at B. A is another point also equipped with a transmitting station. Point A as well as point B are disposed on the major axis of the landing field P which axis is indicated by the arrow. The aircraft F is equipped with two standard or approved radio receiving sets $a$ and $b$ shown diagrammatically. The receiving set $a$ is tuned to the wave length of the radio transmitting station A and the radio receiving set $b$ to the wave length of the radio transmitting station B. Z is an indicating instrument of the type as employed in connection with the known radio beacon system.

In the usual design of these devices the pointer of the device adjusts itself to the zero position arranged on the center line of the scale, whenever the aircraft is directed with its longitudinal axis towards the sole transmitting station acting on the corresponding receiving set. In the present case, however, the indicating instrument is connected with both receiving sets $a$ and $b$ and is, for instance, so designed as to comprise two coils or the like so that it is influenced by both receiving sets.

The receiving circuits and indicator Z may be placed in any convenient location, but the antennae 11 and 12 of Fig. 3, for example, are properly oriented with the longitudinal axis of the craft. The antennae are either mounted transversely of the longitudinal axis or parallel thereto, depending upon whether the receivers are to be operated in accordance with maximum or minimum signal received. If operated at maximum signal, for example, when the craft is headed directly for transmitter A, the pointer Z would indicate zero if only transmitter A were effective thereon. The pointer Z however, is simultaneously affected by the signal received from transmitter B which signal, in the position illustrated in Fig. 1, swings pointer Z to the right as illustrated. Upon further movement along path L the antenna of the receiver is no longer directly pointed at station A. In this event, the station A tends to move pointer Z to the left of the position shown in Fig. 1. Station B on the other hand, still tends to move pointer Z to the right. The relative emitting powers of stations A and B are so proportioned, however, that even though the deviation from station B is greater in angular extent than from station A, the effect of station A predominates and the pointer Z is moved to the left from the position as shown in Fig. 1, so that the craft begins to align itself coincidental with the line between stations A and B. Due to the difference in emitting power of stations A and B, the craft cannot head for a position midway between B and A, for example, but must perforce head for station A first.

The receiving sets b and a, therefore, act on the indicating instrument Z in an opposite sense so that, as above described, the aircraft is deviated laterally from the two rectilinear paths leading to the radio transmitting stations A and B and thus follows the curve L to the point A. The adjustment of the connection is so chosen that the influence of the radio transmitting station A outweighs that of the station B either by operating transmitting station A at higher power or by attenuating the signal received by receiver b to a greater extent than that received by receiver a and, consequently, the radio transmitting station B only acts to correct the path which the aircraft would follow if the station A alone were available.

The high-frequency transmitting stations designated by A and B may be of any suitable type. A connection which may be employed for the purpose under consideration is shown in detail in Fig. 2. The transmitting station disclosed in Fig. 2 consists of a generator G and a high-frequency amplifier H. The generator is composed, as is well known, of a back coupled vacuum tube 1 and an oscillating circuit consisting of an adjustable condenser 3 and of the primary circuit of a transformer 2. The high-frequency voltage produced by the generator is supplied to the input circuit of the high-frequency amplifying tube 7 through the transformer 4, the potentiometer 5 and the transformer 6. The primary of the transformer 8, the secondary circuit of which is connected to the aerial 9, is included in the anode circuit of the tube 7. The potentiometer 5 may be employed to adjust, as above described, the quantity of energy transmitted by the transmitting stations, whereby the power emitted by station A is greater than that emitted by station B so that the aircraft flies on the desired curve (Fig. 1).

The receiving arrangement designated by a, b, Z may be, for instance, constructed as shown in Fig. 3. Two directional aerials, mounted either parallel to or transversely of the longitudinal axis of the craft for instance frames or loops 11 and 12, are tuned to the carrier frequencies by the aid of the adjustable condensers 13 and 14, the carrier frequencies being supplied by the transmitting stations A and B. The voltages available at the end of the receiving circuits are supplied to two receiving circuits comprising two audion connections each consisting of a thermionic tube 17 or 18, a condenser 19 or 20 and a grid leak resistance 21 or 22. As a result of the high-frequency input voltages the grids of the tubes are impressed in a manner well-known in the art with negative direct-current voltages which reduce the anode currents supplied by the battery 23 to an amount depending upon the magnitude of the input voltages. The indicating instrument 24 designated by Z in Fig. 1 is designed as a differential ammeter. The instrument 24 is so dimensioned and connected that it directly indicates, which of the two receiving circuits absorbs the greater amount of energy and so that the pointer is not deflected when the aircraft flies on the prescribed curve. Instead of designing the transmitting stations in such a manner that the energy supplied by the same, may be adjusted, the receiving circuits for the various frequencies may be provided with an adjustable attenuation whereby receiver b may be made less effective by the signal received from transmitter B so that the effect of transmitter A on receiver a predominates. To this end the variable resistances 15 and 16 are provided. Consequently, the pilot is also able to influence the curve in which he desires to head for the landing field.

It is not necessary to use as shown in the drawing two separate receiving circuits. A single receiving circuit suffices if change-over devices are utilized which change over the tuning of the receiving circuit preferably periodically between the waves of the transmitting stations A and B. If this change over is effected in a rather rapid sequence, the effect on the indicating instrument Z or the like is the same as if both waves were received continuously. Such a connection is shown in Fig. 4, which shows but one receiving set 31, capable of being tuned to both waves to be received by means of the adjustable condensers 32 and 33. The tuning is alternated with sufficient frequency between both values by means of the relay 35 fed, for instance, by a low-frequency alternating current, a further relay 34 connecting an audion connection allotted to the corresponding receiving wave to the receiving circuit. The indicating instrument 44 and the audion connections are designed in the same manner as shown in Fig. 3.

It is desirable to reverse the polarity of the corresponding receiving set with respect to the indicating instrument Z when the airplane flies over the transmitting station A, particularly if the receiving set is connected as hereinafter described to an automatic steering device in order that the effect of station A as the craft passes the transmitter A shall be in the same direction as previously when the craft was approaching the station A. This may be accomplished by hand or also automatically, if a marker beacon is provided by means of electric waves passing through the point A as shown at M in Fig. 1 and extending in a vertical plane substantially normal to the path between the two transmitters, the marker acting on an automatic switching device allotted to the receiving set a.

In Fig. 5 is shown an arrangement which permits, when the aircraft passes over the transmitting station A (Fig. 1), to reverse the direction of deflection of the indicating instrument, provided that the deflection has been caused by the transmitting station A. For the sake of simplicity only that portion of the connection is described which is influenced by the transmitting station A.

The energy absorbed by the tuned aerial is supplied (through the connections indicated by the two parallel dotted lines at the left) to the resistance 56 (Fig. 5) and produces at the end thereof a high-frequency alternating voltage which acts on the indicating instrument 64 in the following manner:

(a) If the aircraft is still in front of the transmitting station A the voltage is supplied to the condenser 60 through the relay contact 76, the condenser 60, together with the grid leak resistance 61 and the tube 58, forming an audion connection. The arrangement in this case is exactly the same as that shown in Fig. 3, i. e., the anode current supplied by the battery 63 and flowing through the tube 58 decreases with increasing high-frequency input voltage.

(b) If the aircraft flies over the transmitting station A it passes as above-described at the same time a high-frequency marker running through point A in parallel relation to the front edge of the landing field, the high-frequency marker effecting the change-over of the indicating instrument in the following manner: An auxiliary aerial 65 as shown in Fig. 5 absorbs high-frequency energy when the aircraft passes the marker. The high-frequency energy is converted by means of a demodulator 66 into a direct-current energy which actuates the relays 67, 68, 69; the relay 69 then switches the battery 70 into the relay circuit, thus causing the relays to remain energized after the aircraft has passed the marker. The relay 67 disconnects the input circuit from the condenser 60 and supplies the high-frequency input voltage supplied by the transmitting station A to a rectifier connection 74, by means of an input transformer 72, a vacuum tube 71 acting as a high-frequency amplifier and the output transformer 73. The relay 68 connects at the same time a condenser 75 charged by the rectifier connection 74 to the grid of the tube 58 in such a manner that in contradistinction to the process described under (a) the positive grid potential increases with increasing high-frequency input voltage, i. e., the anode current of the tube 58 increases. In this manner the direction of deflection is, therefore, reversed after the aircraft has passed over the transmitting station A.

By means of the above-described arrangement a very simple means is provided, whereby the airplane may be steered to the point B and in a given direction, i. e., on reaching the landing field it flies in the prescribed direction. For the sake of simplicity a hand control of the airplane has been assumed above. However, it is also possible to employ the above-described arrangement in connection with an automatic steering device of a type well known in the art.

A connection such as shown in Fig. 6 may be, for instance, employed for determining the course of the craft. 80 denotes the aircraft, 81 the rudder thereof. As a directional automatic steering device for this aircraft a compass is employed as a rule in the case of a normal operation. Fig. 6 shows a magnetic compass 82, the magnetic needle 82a thereof being rotatably mounted in a casing filled with an electrolytic liquid. The needle carries at one end thereof an electrode 82b which, for instance, may consist of a copper plate. Two counter-electrodes 82c and 82d secured to the compass casing are allotted to the electrode 82b and, consequently, move relatively to the electrode 82b when the airplane turns in any direction. The casing of the compass 82 may be rotated relatively to the airplane through the crank 83, the shaft 84 and the worm gear 85. In starting the airplane, the base of the compass, i. e., the casing thereof, is correspondingly rotated to the desired course through the crank 83 to such an extent that the scale 86 coupled to the shaft 84 indicates the desired course.

The electrodes 82b, 82c and 82d are arranged in a differential connection, fed by the alternating current source 87 through an adjustable resistance 88, and comprising the rectifier bridges 89 and 90 in both branches thereof. Both armature windings 91a and 91b of a receiver 91 are connected to the direct-current terminals of both rectifier bridges 89 and 90. The receiver 91 is designed in the form of a rotary magnet, i. e., it comprises a stator consisting, for instance, of a permanent magnet and a rotatable system, i. e., the armature with both windings 91a and 91b.

The automatic steering device comprises in addition to the compass 82 in the case of a normal construction, as also shown in Fig. 6, a gyro turn indicator 92 which is so mounted on the aircraft that it is actuated in response to the angular speed of the turning movements which the airplane performs about its normal axis. The receiver 91 and the gyro turn indicator 92 are connected to the rod 98 through a system of levers 93, 94, 95, 96, 97 which rod cooperates with a lever 99, to the right end of which the piston rod 100a of an hydraulic servo motor 100 is connected. The lever 99 is also connected as shown in Fig. 6 to the piston rod 101a of a control valve 101. The other end of the piston rod 100a of the servo motor 100 is associated with the rudder 81 through an intermediate lever 102.

The directional steering device so far described is well known in the art and operates as follows:

Let us assume that the aircraft flies on the desired course. In this case the electrode 82b of the compass 82 is exactly in the mid-position with respect to the two electrodes 82c and 82d with the result that the winding 91a of the receiver 91 receives exactly the same amount of current as the winding 91b of this receiver so that the armature remains in the zero position shown. The same applies to the gyro turn indicator 92 provided that the turning speed of the aircraft about its normal axis possesses the zero value. Assuming that the aircraft has a tendency to turn about its normal axis owing to a gust of wind, the gyro turn indicator 92 is influenced and in some cases the compass 82 as well. The rod 98 is actuated and the control valve 101 moves from the zero position, whereby the servo motor 100 is operated thus causing the rudder 81 to deflect in such a direction as to counteract the disturbing moment.

As above described instead of the compass 82, the instrument Z in Fig. 1 or the instruments in Figs. 3 to 5 corresponding to the instrument Z may be connected to the automatic directional steering device. This may be accomplished in the simplest manner by rotatably mounting the pointer of the instrument in question within a casing filled with an electrolyte. In Fig. 6 the measuring instrument under consideration is shown at 103. The pointer 103a of the instrument 103 is also provided as in the case of the compass 82 at its point with an electrode 103b to which two electrodes 103c and 103d secured to the casing are allotted. Instead of the electrodes 82b, 82c, 82d the three electrodes 103b, 103c and 103d may be connected to the receiver 91 by means of the three-pole switch 104.

The operation is as follows:

If the aircraft attains, for instance, a position corresponding to the position shown in Fig. 1 the switch 104 is thrown over and the instrument 103, corresponding to the instrument Z in Fig. 1 and the instruments 24, 44 and 64 in Figs. 3 to 5, is connected to the automatic steering device; whereupon as above described the airplane follows the curve L (Fig. 1) to the point A.

As above stated the present invention may be carried out by very simple means. The transmitting stations erected at the points A and B are the usual non-directional radio transmitting stations. The normal radio direction finders may be employed as receiving set or receiving sets.

I claim:

1. The method of determining the course of a vehicle supplied with a plurality of similarly oriented antennae which consists in emitting radiant energy of different frequencies in all directions from a plurality of stations, the amount of power emitted from the one of said stations to be first reached being greater than the amount from another of said stations, said stations being disposed so as to define the desired course, directionally and selectively receiving the energy emitted from each of said stations through channels resonant to the respective frequencies transmitted, and combining the received energy differentially thereby to determine the course of said vehicle with respect to said aligned stations.

2. A system for determining the course of a vehicle comprising a plurality of transmitters disposed in line with said course, said transmitters emitting radiant energy at different frequencies and in all directions, the transmitter to be first reached emitting said energy in a greater amount than another of said transmitters, antennae oriented in the same direction on said vehicle, receiving units connected respectively thereto, each of said receiving units being tuned to one of said transmitters, and course determining means differentially connected to said receiving units and responsive to the difference in the respective amounts of energy received by said receivers.

3. A system for determining the course of a vehicle comprising a plurality of transmitters disposed in line with said course, said transmitters emitting radiant energy at different frequencies and in all directions, the transmitter to be first reached emitting said energy in a greater amount than another of said transmitters, a single oriented directional antenna on said vehicle, an amplifying unit, a plurality of tuning means tuned to the different frequencies of said transmitters respectively, means for rapidly alternately connecting said tuning means to said antenna and said amplifying unit, and means differentially connected to the output of said unit and actuated in response to the difference in the respective amounts of energy received by said tuning means.

4. A system for determining the course of a vehicle comprising a plurality of transmitters disposed in line with said course, said transmitters emitting radiant energy at different frequencies and in all directions, the transmitter to be first reached emitting said energy in a greater amount than another of said transmitters, a high frequency marker beacon at said first reached transmitter, the plane of energy of said beacon being substantially vertical to the line between said transmitters, antennae oriented in the same direction on said vehicle, receiving units connected respectively thereto, to receive signals therefrom, each of said receiving units being tuned to one of said transmitters, course determining means differentially connected to said receiving units and responsive to the difference in the respective amounts of energy received by said receivers, a receiving circuit tuned to the frequency of said marker beacon, and means responsive to the output of said receiving circuit to reverse the effect of the signal impressed upon one of said receiver units.

5. In a system for facilitating the landing of aircraft at a landing field, two transmitters disposed in the landing direction emitting radiant energy at different frequencies, the first of said transmitters emitting greater power than the second transmitter, two direction sensitive receivers including similarly oriented antennae on board the aircraft each tuned to one of these transmitters and an indicating instrument differentially connected to these receivers.

6. An apparatus for guiding a dirigible craft comprising at least two differently tuned radio transmitters spaced apart in the direction of a desired course and radiating energy in all directions, that transmitter which is to be first reached emitting greater power than the other, a pair of similarly oriented antennae on said craft, a receiving set having two receiving circuits adapted to be selectively tuned to said two transmitters and connected to said antennae respectively, an instrument having two actuating magnet coils, each being operatively connected with one of said receiving circuits, a common movable element simultaneously actuated by said two coils and disposed to be biased by one of said coils to maintain a position according to the direction of the transmitter in tune with the circuit and actuating said one coil and to be biased by said other coil to deviate into a component direction at a side opposite to the position of the other transmitter in relation to the direction of said first transmitter.

7. The method of orienting a craft in a predetermined path whose direction is determined by a plurality of aligned transmitters said craft being supplied with a plurality of similarly oriented antennae and radiant energy receivers respectively connected thereto, which comprises emitting radiant energy from said transmitters in all directions at different fixed frequencies, the transmitter located at the point to be first reached emitting at a higher power than another of said transmitters, directionally and selectively receiving said energy, combining the respective amounts of said selective energy, deriving therefrom a resultant energy and utilizing said energy to determine the orientation of the craft along said predetermined path.

8. A system for determining the course of a vehicle comprising a pair of transmitters disposed in line with said course and emitting radiant energy at different fixed frequencies and in all directions at substantially the same output intensity, a pair of antennae positioned on said vehicle and similarly oriented, a first and second receiver respectively connected with said antennae and respectively tuned to said different fixed frequencies, the two receivers having adjustable sensitivities, the receiver tuned to the first transmitter to be reached being adjusted to insure relatively greater output current than the other, means differentially combining the currents in the outputs of said receivers and means actuated in response to said combined currents to thereby determine the course of said vehicle.

PAUL EDUARD KÖSTER.